United States Patent [19]

Kalberer et al.

[11] Patent Number: 5,556,056
[45] Date of Patent: Sep. 17, 1996

[54] ADAPTABLE AIRCRAFT AIRBAG PROTECTION APPARATUS AND METHOD

[75] Inventors: Robert C. Kalberer, Boulder, Colo.; Kevin W. Kreutzer, Vacaville, Calif.; Dan Goor, Colorado Springs, Colo.

[73] Assignee: Flight Safety Systems, Inc., Boulder, Colo.

[21] Appl. No.: 287,386

[22] Filed: Aug. 8, 1994

Related U.S. Application Data

[63] Continuation-in-part of Ser. No. 54,925, Apr. 28, 1993, Pat. No. 5,335,884, which is a continuation-in-part of Ser. No. 973,798, Nov. 9, 1992, Pat. No. 5,301,902.

[51] Int. Cl.$^6$ .................................................. B64D 25/00
[52] U.S. Cl. .................. 244/121; 244/118.5; 280/730.1; 280/731
[58] Field of Search ................................ 244/121, 118.5, 244/220, 234; 280/728.1, 728 R, 728.2, 728 A, 729, 730.1, 730 R, 730.2, 731

[56] References Cited

U.S. PATENT DOCUMENTS

| | | | |
|---|---|---|---|
| 2,834,606 | 5/1958 | Berthrand | 280/730.1 |
| 3,884,497 | 5/1975 | Massengill et al. | 280/730.1 |
| 4,536,008 | 8/1985 | Brown, Jr. | 280/730.1 |
| 4,832,287 | 5/1989 | Werjefelt | 244/118.5 |
| 5,190,313 | 3/1993 | Hickling . | |

Primary Examiner—Andres Kashnikow
Assistant Examiner—Tien Dinh
Attorney, Agent, or Firm—F. A. Sirr; Earl C. Hancock; Holland & Hart llp

[57] ABSTRACT

An airbag assembly is positioned relative to an aircraft control yoke in a manner to minimize the application of an undesired force to the control yoke when the airbag assembly is inflated. A disc-shaped airbag assembly is horizontally rod-supported from an aircraft's instrument panel so as to surround the aircraft's horizontally extending control yoke and so as to be independent mechanically thereof. The rods that support the airbag assembly may be spring biased to a quiescent position, and may then be of the telescoping type to accommodate full inward movement of the control yoke as the aircraft's pitch attitude is controlled. In a alternate embodiment of the invention, the airbag assembly is mounted on the ceiling of the aircraft, generally above and somewhat forward of the pilot, the airbag assembly being of a size when inflated whereby the pilot is protected from impact with the instrument panel, and yet subsequent operation of the control yoke by the pilot is not prevented by obstruction of the control yoke.

9 Claims, 9 Drawing Sheets

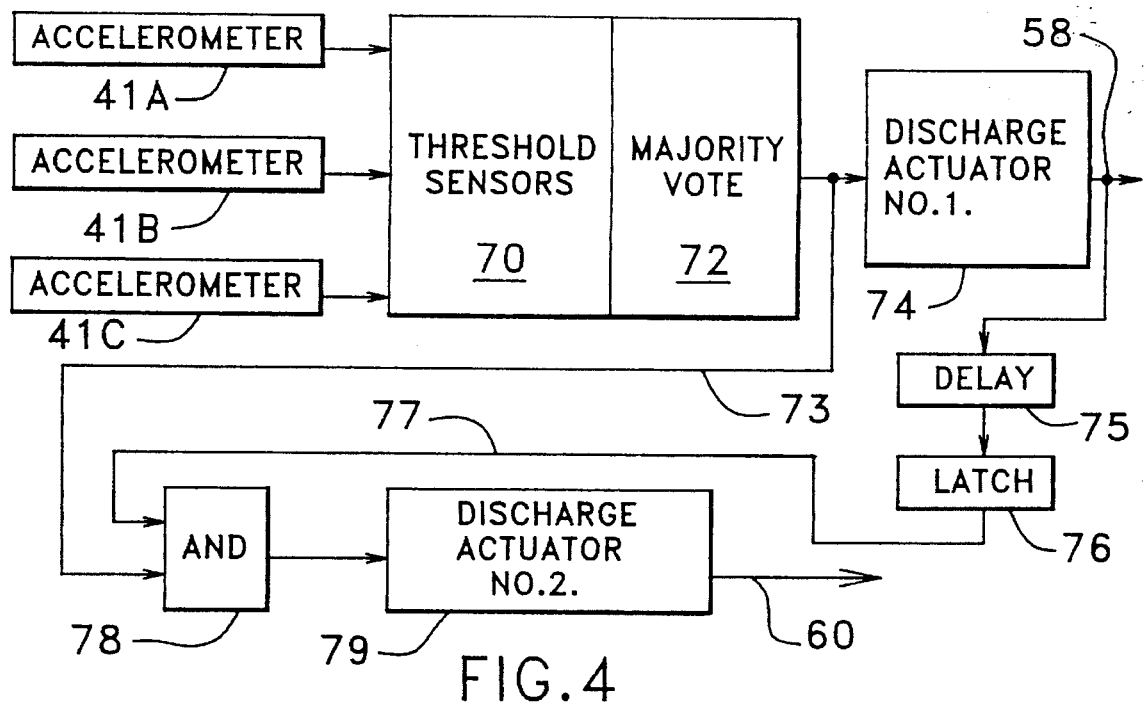
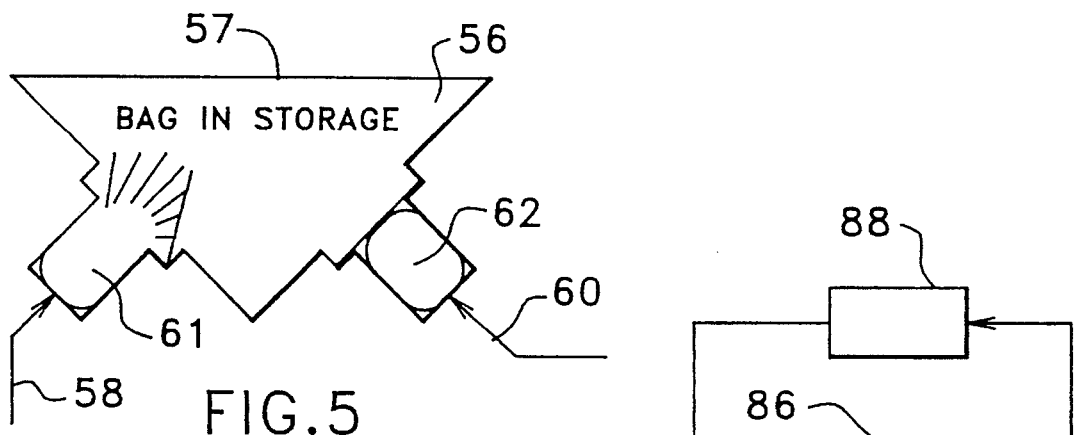
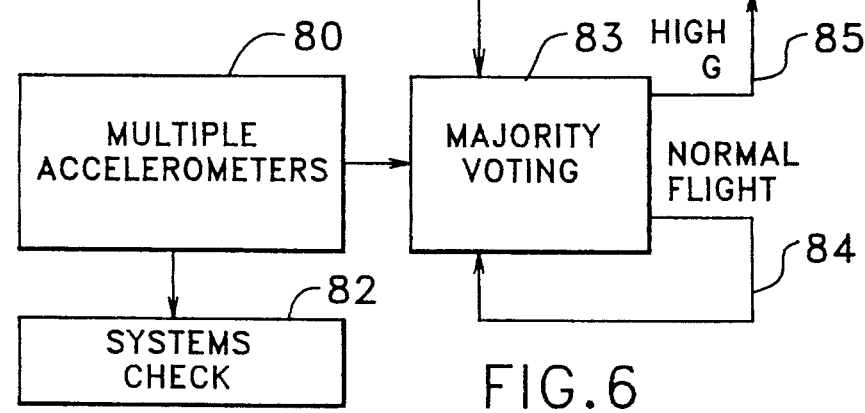

ADAPTABLE AIRCRAFT AIRBAG PROTECTION APPARATUS AND METHOD

BACKGROUND OF THE INVENTION

This application is a continuation-in-part of U.S. patent application Ser. No. 08/054,925 filed Apr. 28, 1993 for ADAPTABLE AIRCRAFT AIRBAG PROTECTION APPARATUS AND METHOD by Robert C. Kalberer and Kevin W. Kreutzer now U.S. Pat. No. 5,335,884, which application was a continuation-in-part of Ser. No. 07/973,798 filed Nov. 9, 1992 for AIRCRAFT AIRBAG PROTECTION APPARATUS AND METHOD by Robert C. Kalberer and Kevin W. Kreutzer now U.S. Pat. No. 5,301,902.

FIELD OF THE INVENTION

The present invention relates to devices and processes for improving the ability of an aircraft occupant to survive a crash of that aircraft. More particularly, the present invention relates to safety oriented apparatus and methods for employing airbags to increase the prospects of survival of an aircraft occupant despite a serious traumatic injury to the aircraft thus occupied. Although potentially applicable to other types of vehicles or crafts, the invention is especially useful for small aircraft, as well as commercial aircraft, and is well suited as a modification of existing aircraft.

DESCRIPTION OF THE PRIOR ART

The application of airbags as a safety feature to protect a vehicle occupant from injury (or at least minimize the prospect of injury to the vehicle occupant) has received considerable attention in conjunction with the automobile industry. For instance, U.S. Pat. No. 3,836,168 by Nonaka et al shows airbags which are functionally operable in conjunction with a shoulder harness. However, these airbags are intended to position a restraining net, or panel, in response to a collision.

A somewhat accordion-like, deformable instrument panel and a passenger side, upwardly inflating airbag is shown in Oka et al U.S. Pat. No. 3,819,204. The deformable panel extends from the front of the vehicle below and towards the steering wheel of an automobile to absorb energy while avoiding loss of visibility for the driver. It does not address the problem of minimizing injury to a seat occupant without impacting the steering mechanism, as is involved in aircraft accidents.

An airbag configuration intended to expand laterally in front of a bench-type seat in an automobile, and employing a configuration using multiple compartments within a single airbag is shown in U.S. Pat. No. 4,262,931 by Strasser et al. While the intended purpose of this lateral extension is to provide airbag protection for the center occupant of such a bench-type automobile front seat, the patent does not suggest use of a laterally extending airbag so as to cover a side post or offset protection feature, nor does it teach adaptation of such a concept to aircraft.

The prior art has suggested double actuations of airbags, such as in U.S. Pat. No. 5,067,744 by Hirabayashi and 4,449,728 by Pilatzki, for example. In Hirabayashi, a unitary airbag is actuated twice in sequence. That is, a first gas generator is initially actuated by Hirabayashi and, at a predetermined time interval later, a second gas generator is actuated. Obviously, the Hirabayashi device could only prove useful in an airplane if the predetermined time interval between actuations happens to exactly coincide with the time interval between the two traumatic events to the aircraft. Hirabayashi does not suggest a system which includes dual (or multiple) collision sensing for the purpose of controlling pressurization of a common airbag, nor of multiple airbags at a common occupant protecting location.

The Pilatzki patent shows two separate airbags, both stowed in the steering column hub. The first airbag is actuated on a collision-sensing level of a first magnitude, whereas a larger second airbag is actuated when an event characterized as a "more violent smash-up" has occurred. Pilatzki does not teach dual airbag actuation based upon sequential traumatic event sensing.

Some prior art has addressed specific applications of airbags to aircraft, such as in U.S. Pat. No. 4,508,294 by Lorch and 3,218,103 by Boyce. The Lorch patent includes a bidirectionally expanding set of airbags from a hoop around the waist of the aircraft occupant to encapsulate that occupant upon actuation. The Boyce patent likewise teaches use of a relatively complete encapsulation of the occupant of a seat although it is shown operational in conjunction with a shoulder harness.

U.S. Pat. No. 2,834,606 by Bertrand shows airbags mounted from the ceiling of an automobile. However the construction and arrangement of this automobile configuration of airbags does not enable control of the automobile to continue after airbag inflation.

None of the known prior art teaches use of airbags which extend both between the dash and a yoke, or steering column, as well as between that steering column and the occupant so as to neutralize any airbag actuation effect upon the steering column while providing impact absorption functions. Accordingly, it is apparent that an airbag system which is configured so as to neutralize actuation effects upon the yoke, or stick, of an aircraft is not shown or taught in the prior art, nor is the use of double airbag actuation based upon sequential collision event sensings. Further, the prior art devices fail to sense multiple trauma events so as to perform the multiple actuation, nor do they provide for reliable excessive G-force sensing through redundancy and majority voting.

DISCLOSURE OF THE INVENTION

Aircraft crashes frequently involve a multiple sequence of traumas to the aircraft itself. For instance, a typical crash scenario might involve a dual sequence of serious traumas wherein the aircraft initially contacts some object, such as a tree or hill top, power line, or other aircraft. This trauma is subsequently followed by a plunge to the ground. Either trauma can cause injury, or fatality, to the aircraft occupants which is all the more regrettable if the initial trauma was not so severe as to prevent continued control of the aircraft. However, the present invention is effective even if the initial trauma renders further control impossible or if continued control is not necessary.

The problem of multiple trauma to an aircraft is addressed by the present invention through the use of airbags for neutralizing an aircraft yoke (or stick) position, and/or an arrangement of double airbag actuation based upon collision sensing for both inflations together as elements of a system. That is, one feature of this invention involves an arrangement using airbags for neutralizing an aircraft yoke in a manner such that airbag inflation and occupant protection functions are realized independent of the yoke, and vice versa.

A second feature of this invention relates to use of double, or multiple, airbag actuations upon sensing separate impact events. The effectiveness of the present invention is enhanced by using it in conjunction with various other contemporary elements, such as the use of stretch-type seatbelts, energy-absorbing seat cushions and redundancy of critical components, and/or self testing sensing and control systems. Yet another feature of this invention is concerned with majority voted G-sensor sets in a configuration for enhancing reliability of the system, despite the crash trauma to the aircraft.

Apparatus in accordance with this invention, minimizes the prospect for loss of control in a craft which has a control yoke positioned for gripping by an individual in proximity to that yoke. Such control yokes typically are constructed for multiple degrees of motion thereof in conjunction with control of the associated craft.

Sensors are arranged to detect that the craft has experienced an abnormal, or injury threatening force. An airbag is mounted relative to the control yoke for responding to an actuation signal by expanding so as to substantially fill the space in at least two directions. It fills the space between the control yoke and the operating individual who is in proximity to it. In addition, the airbag is configured to fill the space between the control yoke and the frame of the craft, thereby retaining the control yoke in a neutral position. An airbag actuation signal is produced when the sensors detect the abnormal force so as to rapidly expand the airbag into its somewhat cocoon like envelope.

The sensor can include a plurality of G-force sensors, at least one of which is aligned with the normal direction of movement of the craft. Further, these sensors can include at least one string or array of G-force sensors which are all positioned in common alignment. Reliability is enhanced by determining that a majority of these commonly aligned G-force sensors are detecting the presence of an abnormal level of G-force before producing the airbag actuation signal.

The method of this invention is particularly useful for minimizing injuries to an occupant of an aircraft which has a manually operable yoke positioned between a front panel, or windshield, and the seat of the occupant. Typically, these yokes are positionable in all three axes for manual control of the aircraft movement in a given line of direction. Initialization of the process starts with detection that an excessive G-force was applied to the aircraft in the general direction of movement thereof. The response to this detection is the filling of the space between the occupant and the front panel with a force absorber, typically an airbag. This force absorber is arranged so that the manually operable yoke is retained in a relatively neutral position subsequent to the responding step.

Reliability of the detecting step is improved if the detecting of excessive G-force occurs at a plurality of locations, and it is determined that a majority of the G-force detections at those locations has concurrently occurred before actuating a response thereto. The neutral retention of the yoke is possible by inflating an airbag from the aircraft yoke towards the occupant, and the front wall concurrently.

Positioning of a portion of the airbag, which moves toward the occupant so as to intervene between the occupant and at least a portion of the aircraft interior which is offset from the direction of movement of the aircraft, can minimize injury to the occupant from impact upon side posts, or other components of the interior of the aircraft cabin.

Another feature of this invention resides in apparatus for minimizing the prospect of injury and loss of control in a craft which has a control yoke having a post extending from a control panel to a member manually grippable by an individual for multiple degrees of motion thereof for controlling the craft operation. A sensor determines that the craft has experienced an abnormal force. An airbag assembly is employed including an inflatable airbag mounted relative to the control yoke for responding to an actuation signal. This response results in expanding of the airbag so as to substantially fill the space both between the control yoke and an individual in proximity to the control yoke as well as between the control yoke and the frame of the craft.

This airbag inflation is done so as to retain the control yoke in a relatively neutral position in conjunction with a mount for the airbag assembly for allowing it free movement along a line in a direction generally parallel to the control yoke post while retaining the airbag assembly against movement in any other direction. The output of the sensor produces an airbag actuation signal for rapidly expanding the airbag upon the occurrence of the abnormal force relative to the craft whereby the airbag assembly will assume a neutral position along a line parallel to the control yoke post. The airbag assembly will continue to seek this neutral position even if the operator moves the yoke in a normal craft controlling manner.

The method of the last mentioned feature minimizes injuries to an occupant of an aircraft which has a manually operable yoke positioned between a front panel and the seat of the occupant who will manually control the craft as it moves in a given line of direction. The method steps include detecting that an excessive G-force was applied to the craft in the general direction of its movement. The detecting step causes a response wherein the space between the occupant and the front panel is filled with a force absorber normally stored in a container. The force absorber container is allowed to move in a direction generally parallel to the line of direction of movement of craft while movement of that container is prevented in any other direction. As a result, the manually operable yoke is retained in a relatively neutral position subsequent to the response to the detecting step but is capable of movement to any position independent of the airbag module location.

The invention provides a disc-shaped airbag assembly that is mounted to the aircraft's instrument panel in a manner to freely surround the control yoke, for example by way of spring biased rods that telescope to accommodate inward movement of the aircraft's control yoke as the pitch attitude of the aircraft is controlled.

An embodiment of the invention provides an airbag assembly is mounted on the ceiling of an aircraft, generally above and somewhat forward of the pilot, the airbag assembly being of a size when inflated whereby the pilot is protected from impact with the instrument panel, and yet subsequent operation of the control yoke by the pilot is not prevented by obstruction of the control yoke.

Those having normal skill in the art will recognize the foregoing and other objects, features, advantages and applications of the present invention from the following more detailed description of the preferred embodiments as illustrated in the accompanying drawings.

BRIEF DESCRIPTION OF THE DRAWINGS

FIG. 4 is a block diagram of the circuit elements employed in a system for actuating dual gas discharge generators for one or more airbags.

FIG. 5 is a schematic view of an arrangement for dual actuation of a common airbag.

FIG. 6 is a block diagram of circuit elements adapted for dual actuation of a common airbag.

FIG. 7 is a view of a modification to accommodate airbag travel for an aircraft having a longer control yoke to front panel distance than the control yokes of FIG. 1.

DETAILED DESCRIPTION OF THE PREFERRED EMBODIMENTS

Contemporary aviation is continuously faced with the long standing problems of safety which has a somewhat suppressing effect on the manufacturers and operators within the industry, particularly as a result of their concern with liability. This keen interest in reducing injuries, and fatalities, applies to both the commercial and private aircraft.

Airbags, in accordance with this invention, are deployed in a unique manner to adapt the aircraft to the environment. The details which follow describe a system which could have an advantageous effect of substantially reducing injuries, or fatalities, in the event of an aircraft crash. This same system, utilizing the principles described, would benefit passengers in commercial, as well as in relatively small private aircraft, as is described below.

Figure 1:
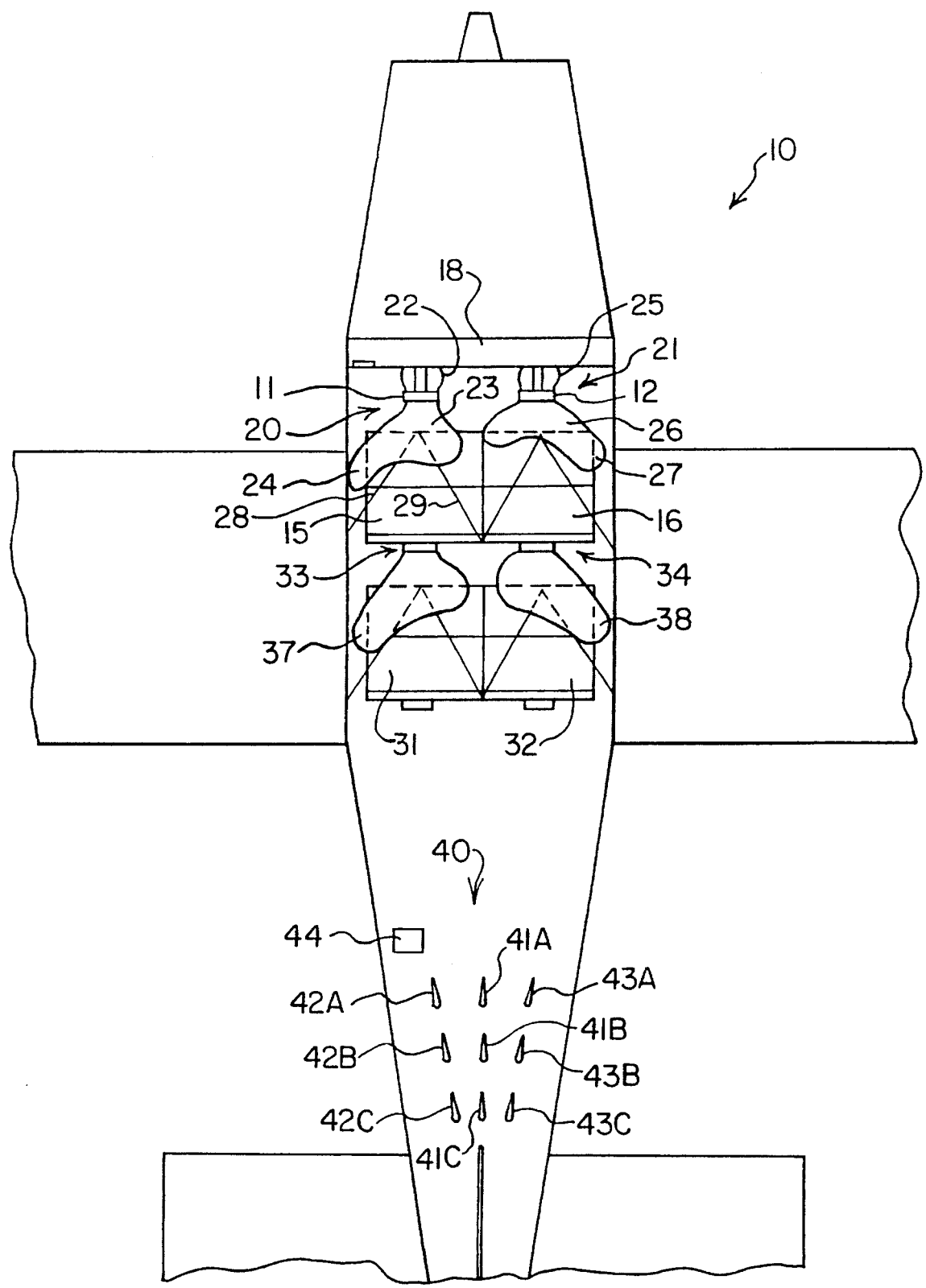
FIG. 1 is a top plan view of a four passenger aircraft illustrating modifications pursuant to the present invention.

FIG. 1 is a top, somewhat schematic view of a four passenger aircraft 10. As is typical, it has two control columns, or yokes, 11 and 12 either extending towards seats 15 and 16 from the instrument panel or front wall 18 as shown, or extending upwardly as sticks, or pedestals, from the floor in front of seats 15 and 16.

Airbag storage and actuating assemblies 20 and 21 are, respectively, attached to (or constructed as an integral element of) each of yokes 11 and 12. These assemblies are connected to the control circuitry via cable 19 (note FIG. 2). The airbags associated with assemblies 20 and 21 are each configured to produce dual lobes, such as 22 and 23, for assembly 20, along with 25 and 26 for assembly 21 when actuated. Lobes 22 and 25 extend toward front wall 18, while lobes 23 and 26 extend towards the respective occupants of seats 15 and 16.

In the event of a crash, a single airbag, which would protect the occupants of seats 15 and 16, would apply a distressing forward, or backward, force to yokes 11 and 12 if acting alone. While such a force on the yokes is immaterial in the event of a trauma associated with a terminal impact upon the earth, it would exacerbate the problem if the trauma was from some type of an airborne impact, or from a false detonation of the airbag actuator. For example, if aircraft 10 clipped a treetop, power line, or the like, the aircraft might remain controllable following the impact. However, actuation of an airbag upon impact might reduce injury to the seat occupants, but the force it could apply on the control yoke might cause aircraft 10 to nosedive into the ground or to nose upward uncontrollably.

By the present invention, actuation of the airbag assemblies, in response to the initial impact, will cause lobe sets 22/23 and 25/26 to cooperate so as to maintain yokes 11 and 12 in relatively neutral positions. The occupants thus at least have the prospect of recovering control of the aircraft while minimizing the prospects of injuries to themselves.

Most severe aircraft trauma throws the occupants forward, or slightly off line, from the direction of travel. Unfortunately, an impact which is slightly offset from the direction of travel of aircraft 10 will tend to propel the occupants towards side posts involved in the cabin framework. Accordingly, airbag assemblies 20 and 21 further include a respective portion 24 and 27 which expands so as to intervene between the occupants, and the windshield side posts (not shown).

Rear seats 31 and 32 likewise include airbag assemblies 33 and 34 which expand from the rear of seats 15 and 16 upon actuation. While these airbags are somewhat more conventional, they do include additional side lobes 37 and 38 to protect against cabin frame element impacts. They also could take the form of multiple airbags.

Mounted towards the tail of aircraft 10 are arrays 40 of G-activated sensor strings 41, 42 and 43. These strings 41–43 are made up of multiple sensors to enhance reliability. The central string, made up of sensors 41A, 41B and 41C, is essentially aligned with the central axis of aircraft 10 and, therefore, corresponds to the normal direction of travel of aircraft 10. The left string of sensors 42A–42C and right string of sensors 43A–43C are each offset in alignment from central string 41, such as by 30 degrees. This allows sensing of impact G-forces even when the aircraft is moving in a direction displaced from directly straight ahead, which frequently happens because of air currents, winds, aircraft maneuvers to avoid objects, and the like. Of course, it is possible to include additional strings of sensors in a fan pattern in an even more offset relation to the central axis of the aircraft.

The circuitry for responding to the output signals produced by array 40 is mounted at 44. It is coupled to receive the G-force signals and, when appropriate, to activate all of the airbags, as is discussed below.

Figure 2:
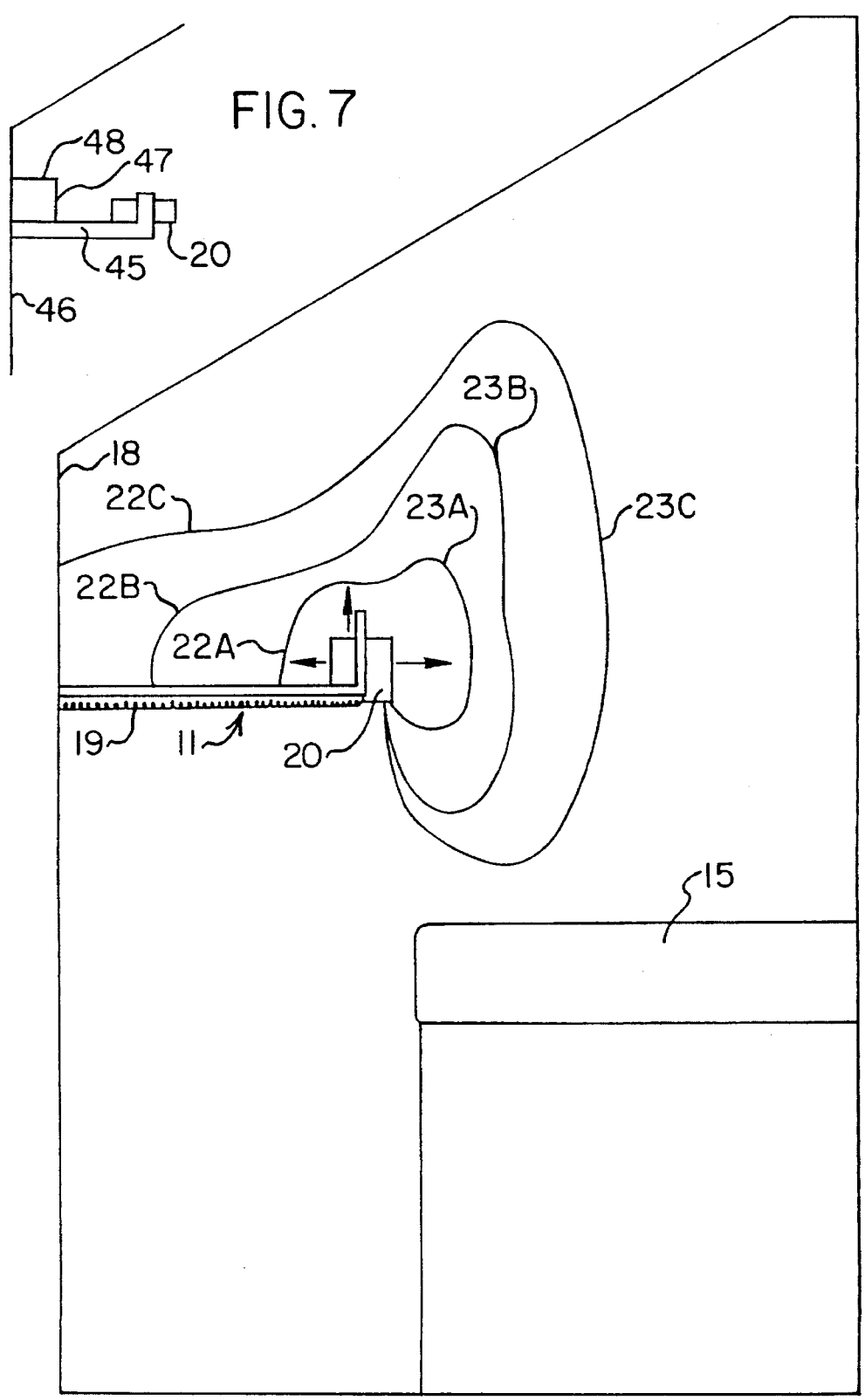
FIG. 2 is side view showing the sequential positioning of an airbag relative to the control yoke of an aircraft.

FIG. 2 presents a side view of yoke 11, and the airbag actuation sequence from assembly 20. Discharge of the expansion gas at assembly 20 causes the airbag to expand, as is generally illustrated by the three sequential positions 22A/23A, 22B/23B and 22C/23C. The bag is configured such that the forwardly directed lobe 22 engages the front wall 18 at approximately the same time the full extension of the rear facing lobe 23 engages the front of the occupant of seat 15. As a result, yoke 11 is maintained in a neutral position, and not forced into a catastrophic motion.

FIG. 7 depicts a possible modification to accommodate airbag assembly 20 for an aircraft control yoke 45 which is longer than yokes 11 or 12 of FIG. 1. Since the engagement of the front wall 46 concurrently with engagement of the seat occupant is important, an adapter frame 48 is positioned so that the forwardly moving portion of the airbag will encounter the face 47 with a combination of timing and distance of travel equivalent to that associated with wall 18 engagement by lobe 22C in FIG. 2. Adapter frame 48 could also take the form of a collapsible, energy absorbing structure, if desired.

Figure 3:
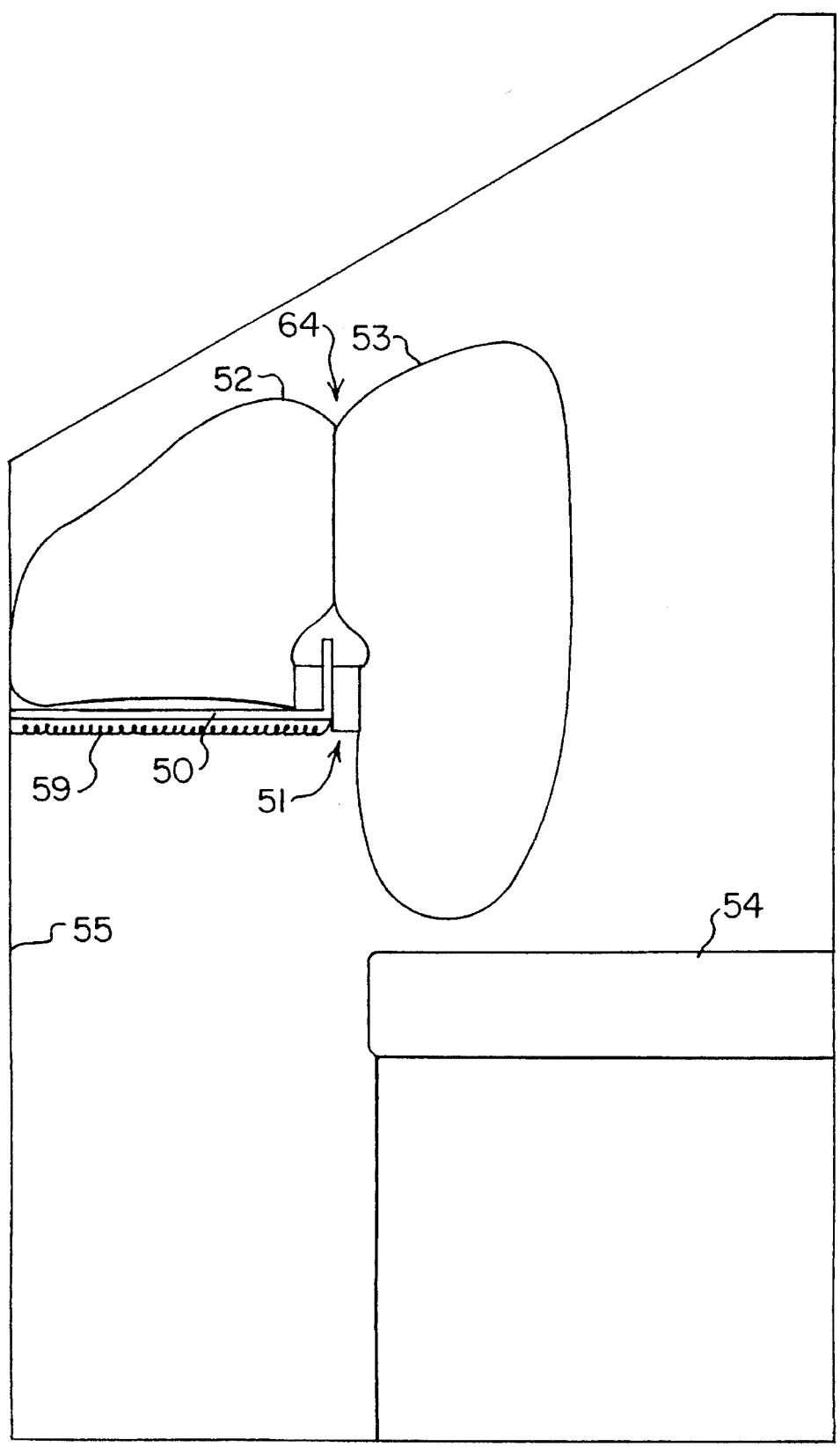
FIG. 3 is a side view of an alternative embodiment of airbags associated with an aircraft control yoke.

An alternative airbag embodiment is shown in FIG. 3, wherein yoke 50 has airbag storage and actuator assembly 51 attached, as shown. Assembly 51 is connected to receive actuation signals from the controller unit, or module, by means of cable 59. Upon impact, two separate airbags 52 and 53 are concurrently actuated to expand in both directions, as shown. Airbag 52 is configured so that, when fully extended, it engages front wall 55 at substantially the same time and travel distance that airbag 53 engages the front of the occupant of seat 54. Airbags 52 and 53 are configured to expand into a mutually engaging interface 64 so the neutral position of yoke 50 is maintained, while the entire space between the occupant of seat 54 and wall 55 is filled with the airbags thereby providing the energy absorber function.

In operation during an impact, the bag, preferably transparent, deploys from the yoke to the pilot, as well as from the yoke to the instrument panel or dashboard. The bag preferably incorporates a sidewardly directed lobe to reduce impact from side loads. Furthermore, it is possible to design the system so that the bag can deploy multiple times, such as two separate inflations spaced in time, if the aircraft experiences two distinct but serious impacts.

Although the airbag is mounted on the yokes, or as an integral part of the yokes, its design is such that even an accidental deployment would not interfere with aircraft control. A bag with a side lobe is useful for the aircraft passengers as well as for the operating crew members. It does not matter whether the aircraft has a stick instead of a yoke, as long as the airbag is placed so that forces from airbag actuation are not allowed to cause disastrous motion to the stick or yoke.

The sensors of array 40 are activated by an injury threatening G-force located on the longitudinal axis, and within a range of angular displacement from that axis, such as, approximately 30-degrees on either side. Single sensors of strings 41–43 are acceptable, but it is preferable to include two or more sensors in each full set of G sensor strings for redundancy. If three sensors are used, as shown, and at least two of those three in series are needed to activate the bag, the remote prospect of a false activation of the bag becomes even more remote. Furthermore, only two out of the three in series in a given string are needed in an actual crash.

Other contemporary safety features can augment the protection of the aircraft occupant. For example, a four-point safety harness (such as an arrangement employing harness straps 28 and 29 for seat 15 in FIG. 1) with a load limiter-type webbing can assist in increasing the ability to withstand a crash force. Also, seat cushions of a collapsible material that yields under high vertical loads can also help.

A block diagram of control circuitry associated with dual actuation of a single airbag is shown in FIG. 4, and could provide actuation signals to the airbag inflation assemblies shown in FIG. 5. The bag is contained within a storage compartment 56, and expands from face 57 in response to an actuator signal 58 which causes gas generator 61 to fire. The airbag deflates shortly thereafter as is conventional. Should a second impact occur, as where an aircraft has first hit a treetop or powerline and subsequently hits the ground, a second actuator signal 60 is generated to fire a second gas generator 62, thereby reinflating the airbag which is then, at least partially, collapsed. Alternatively, it is possible to channel the output of generator 62 into a new airbag.

A typical set of control circuit elements is shown in FIG. 4 for G-force sensing accelerometers 41A, 41B and 41C. Similar circuitry functions in conjunction with the sensors 42A–42C and 43A–43C. The electrical output signal from each accelerometer 41 must exceed a predetermined minimum level as established by a plurality of threshold sensors 70 before they produce any input to majority vote circuit 72. That is, at least two of sensors 41 must exceed the threshold level before any output is produced by majority vote circuit 72. Majority vote circuits are well known, and were extensively developed in the early days of manned space vehicle flights.

Note that it is possible to use only two or more than three sensors to provide for the majority vote input, although the former obviously requires unanimous voting to produce an output. In addition, the majority vote circuit 72 can receive the outputs of the sensors in any other array as a parallel input thereto. Alternatively, the other sensor arrays, such as 42 and 43, can each provide their inputs to separate majority vote circuits.

Once an output is produced by circuit 72 at its output line 73, discharge actuator No. 1 sends a signal 58 to actuate gas generator 61. Signal 58 is delayed by circuit 75, for a very brief period, long enough to prevent concurrent actuation of gas generator 62 with signal 58. This delayed output signal from circuit 75 then sets latch 76 so as to enable AND circuit 78 to respond to any subsequent signal at 73 from the majority vote circuit 72. The concurrence of a set condition for latch 76, and a majority voted output 73, enables discharge actuator No. 2 to communicate a signal 60 so as to actuate gas generator 62.

Note that actuation signals 58 and 60 can function to enable two entirely separate airbags, as well as sequentially actuate a single airbag, as described.

FIG. 6 presents an overview of another system block diagram for describing the functional operation of this invention. Arrays of accelerometers 80 can include any predetermined configuration of G-force sensors, including a 360 degree pattern, if desired. The systems check 82 is a conventional operation for the purpose of sampling and checking the system to warn the operator if any portion of the circuitry fails to pass operational checks.

When implemented in digital circuitry, the majority voting circuit 83 samples the outputs of sensors 80 to determine if an excessive G-force is present. If not, a normal flight signal 84 is indicated, and the sampling resumed. Once a majority of sensors 80 in an array concurrently produce signals indicating an excessive G-force is encountered, a "high G" signal 85 drives bag detonator 86 to fire the airbag gas generator, or generators. A delay 88 prevents majority vote circuit 83 from producing another high G signal 85 until adequate time has passed for the airbag to deflate.

Figure 8:
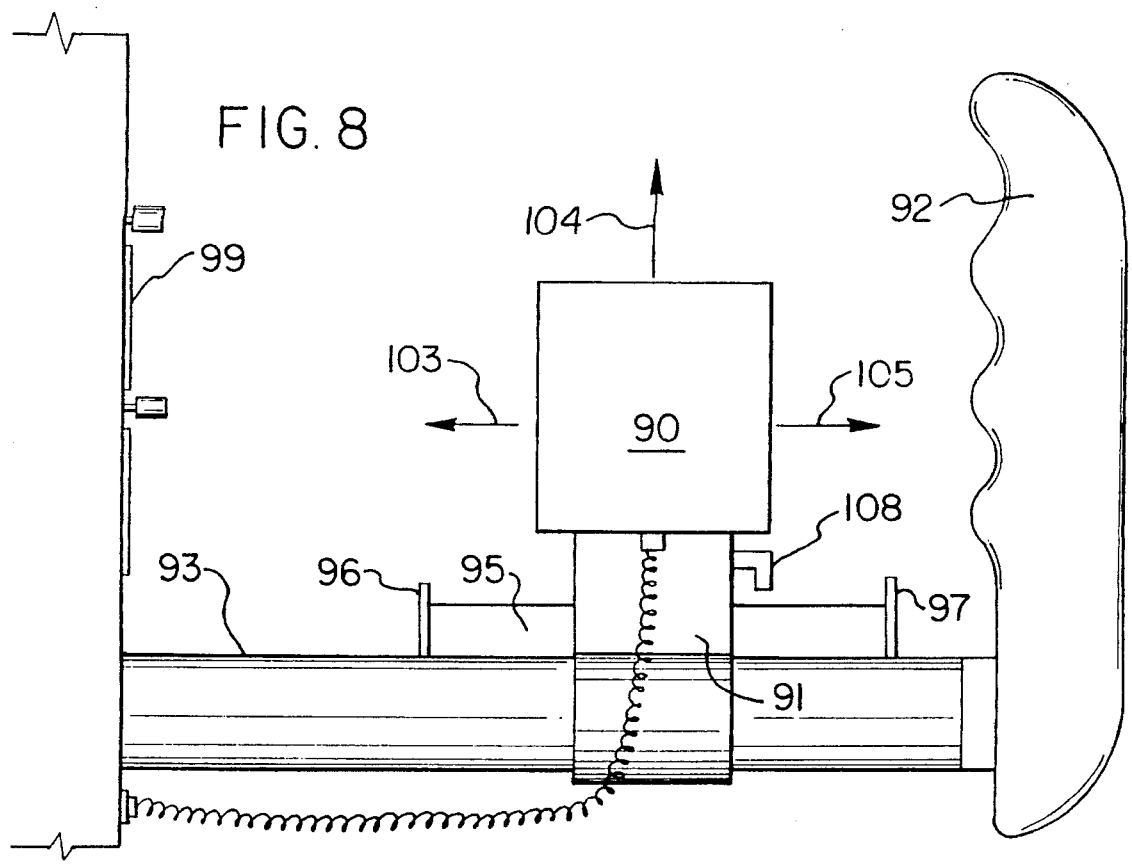
FIG. 8 is a side view of an aircraft control yoke including an arrangement for automatic centering of the actuated airbag relative to the yoke.

An embodiment for automatically centering the airbag upon actuation thereof is shown in FIG. 8. The airbag module 90 is attached to a collar 91 which slidingly surrounds yoke post 93. A track 95 is attached to (or formed as an integral part of) the upper portion of yoke post 93 and cooperates with the channel portion 94 of collar 91 to retain and guide module 90 parallel to yoke post 93. Stops 96 and 97 prevent module 90 from escaping from track 95.

Figure 11:
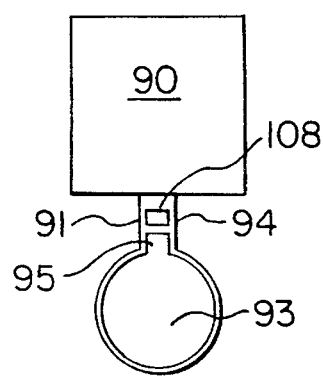
FIG. 11 is a section view of the aircraft control yoke with a FIG. 8 type of airbag assembly thereon.

A sectioned view of the sliding collar assembly 91, yoke post 93 and retainer track 95 is presented in FIG. 11. Channel portion 94 is keyed to cooperate with guide 95 so as to maintain airbag module 90 in a generally upright position. The surfaces which interface between the interior of collar assembly 91 and yoke post 93 as well as guide track 95 must include materials that will present the minimum friction possible so as to minimize interference with either the control movements of the yoke in response to manipulation of hand grips 92 and/or the sliding movement of collar assembly 91 relative to yoke post 93. For instance, the low friction interface of collar assembly 91 with respect to track 95 and yoke post 93 is obtainable by employing Teflon parts or Teflon coated parts, ball bearing mounts, or any other suitable friction minimizing structure and materials.

The sliding movement of collar assembly 91 allows airbag module 90 to assume a neutral position especially as is defined by contact with the panel 99 and the occupant of seat 100 in response to inflation of airbag 98 regardless of the yoke position. The airbag is allowed to fully deploy so as to fill the total space in front of the seat occupant to the instrument panel.

Upon detection of an injury threatening G force, airbag 98 of assembly 90 is actuated so as to extend towards the instrument panel 99 as well as slightly upward and towards the occupant of seat 100. This is generally indicated by arrows 103–105 in FIG. 8 and by the top view of FIG. 9 which likewise shows the corner expansion of the airbags to protect the occupant from the corner posts (not shown in FIG. 9). That is, airbag 98 upon actuation extends towards the occupant of seat 100 on one side and towards the instrument panel 99 on the opposite side thereby completely filling the space between the occupant and the panel 99.

The actual pitch position of yoke 92 as a result of the sliding movement of the yoke from manual motivation of hand grips 92 towards or away from an instrument panel 99 is unaffected by either an accidental or intentional inflation of the airbag. The sliding collar assembly 91 not only allows the airbag to automatically center itself between the occupant and panel 99 but it accommodates relatively movement of yoke 92 towards or away from panel 99 despite the airbag actuation.

Preferably module 90 is retained in a relatively fixed position on yoke shaft 93 during normal operation of the craft so that it will not shift position hazarding distraction to the operator and/or damage to the mechanisms. This is accomplished in the example shown in FIGS. 9 and 11 by means of an angle arm 108 which normally fits over end stop 97 on track 95. Arm 108 can take the form of a frangible element which breaks free in response to pressure on collar assembly 91 caused by actuation of the airbag or could include a mechanism responsive to the airbag actuation by pivoting out of engagement with stop 97. If desired, an equivalent to arm 108 cooperating with end stop 96 could provide the same function on the other end of track 95.

Furthermore various other retaining devices are available for retaining module 90 in place until needed. For example, this function is possible by use of one or more frangible posts extending from the surface of track 95 transverse to the direction of movement of module 90 over track 95 so as to hold module 90 in place but with these posts configured to fracture in response to presence of excessive G-forces and/or the airbag actuation signal.

Note that the right side yoke and airbag module assembly 101 functions substantially the same as was described above except it deploys airbag 102 so as to protect the occupant of seat 106 including a lobe to protect against right side corner posts. The airbag module likewise has a retainer track along the upper surface of the yoke post with that module freely sliding to a neutral position upon actuation of the airbag 102.

Figure 10:
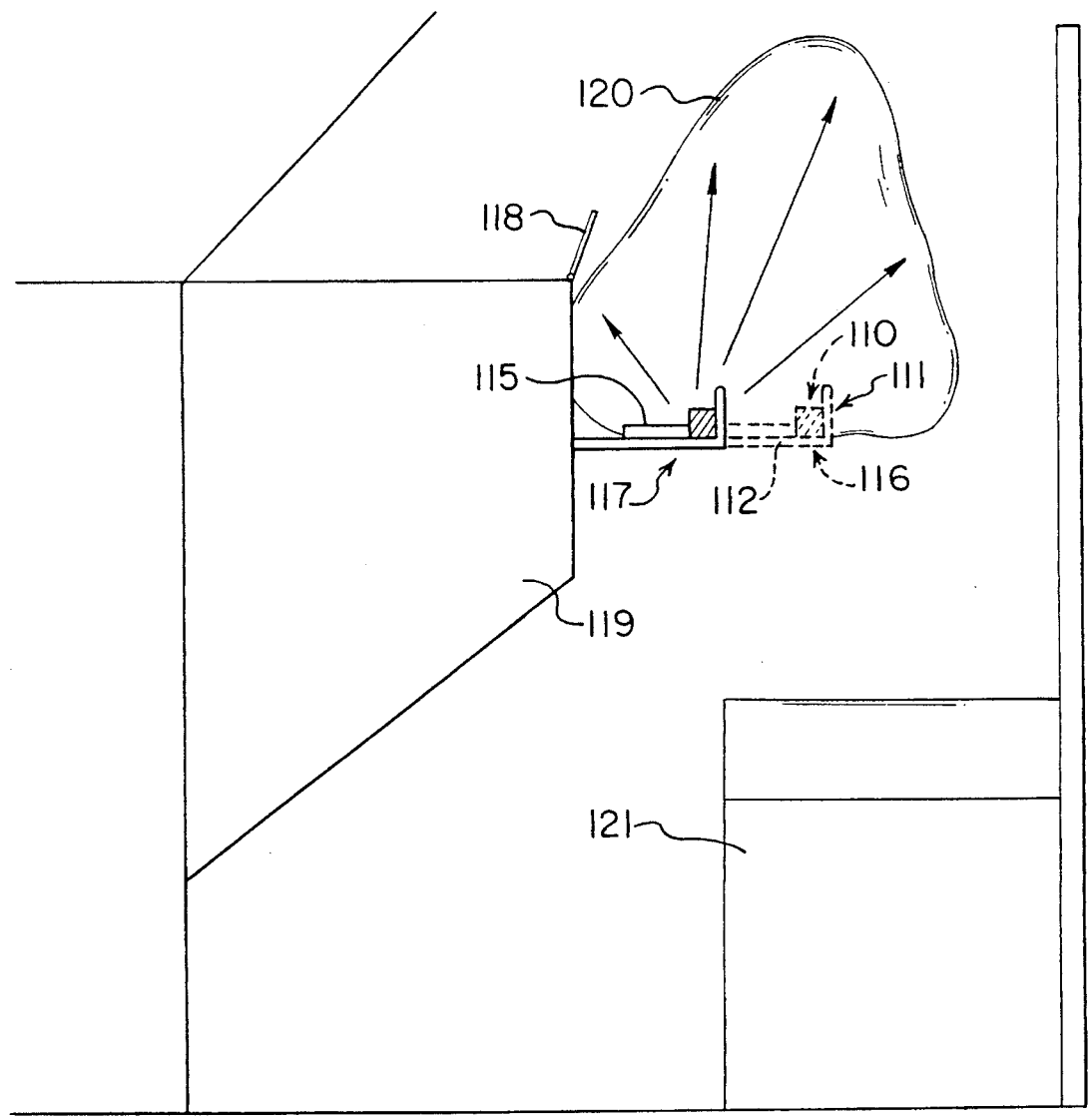
FIG. 10 is a side view of another embodiment of an automatic centering airbag assembly slidable attached to an aircraft yoke.

FIG. 10 presents another embodiment of a sliding airbag module 110 on yoke post 112 of yoke 111. Module 110 is slidingly retained and guided by track 115 with minimal friction along the lines of the previous descriptions herein. In normal operation, module 110 remains at positions 116, 117 via a retainer along the lines of arm 108, frangible retainer posts, or the like described previously herein until the airbag is actuated. Regardless of the position of the yoke 111, the module 110 upon inflation will slide to the neutral position, as above described, allowing airbag 120 to fully deploy towards both the aircraft instrument panel 119 and the occupant of seat 121. Even while airbag 120 is fully deployed, the pitch position of yoke 111 is still variable under the manual control of the occupant of seat 121 substantially the same as in normal flight.

If the craft has a hinged glare reducing flap 118 extending from the instrument panel 119, it is possible to attach it by a break away structure or by a hinge type mechanism which permits it to pivot as shown in FIG. 10.

The intent is to allow airbag 120 as it inflates upwardly upon engagement with panel 119 to force flap 118 to break away or pivot upwardly out of the way as shown so as not to interfere with the normal function of airbag 120.

Figure 12:
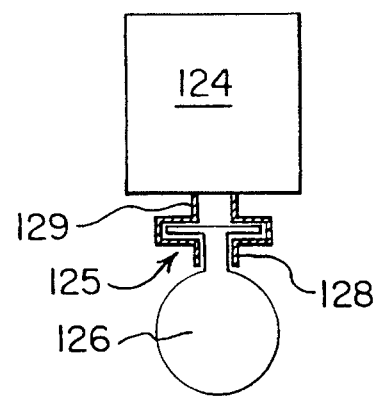
FIG. 12 is a section view of an alternate configuration of an aircraft yoke mounting assembly.

FIG. 12 shows a sectioned view of another configuration of a retaining and guiding track subassembly 125 for airbag module 124 relative to yoke post 126. In this configuration, a rail 128 of a T-shaped cross-section is attached to the upper side of yoke post 126. The downward projecting portion 129 of subassembly 125 has a hollow internal chamber to slidingly receive T-member 128 therein with a low friction interface therebetween. This configuration enhances the stability of the retention of module 124 with respect to post 126.

Figure 9:
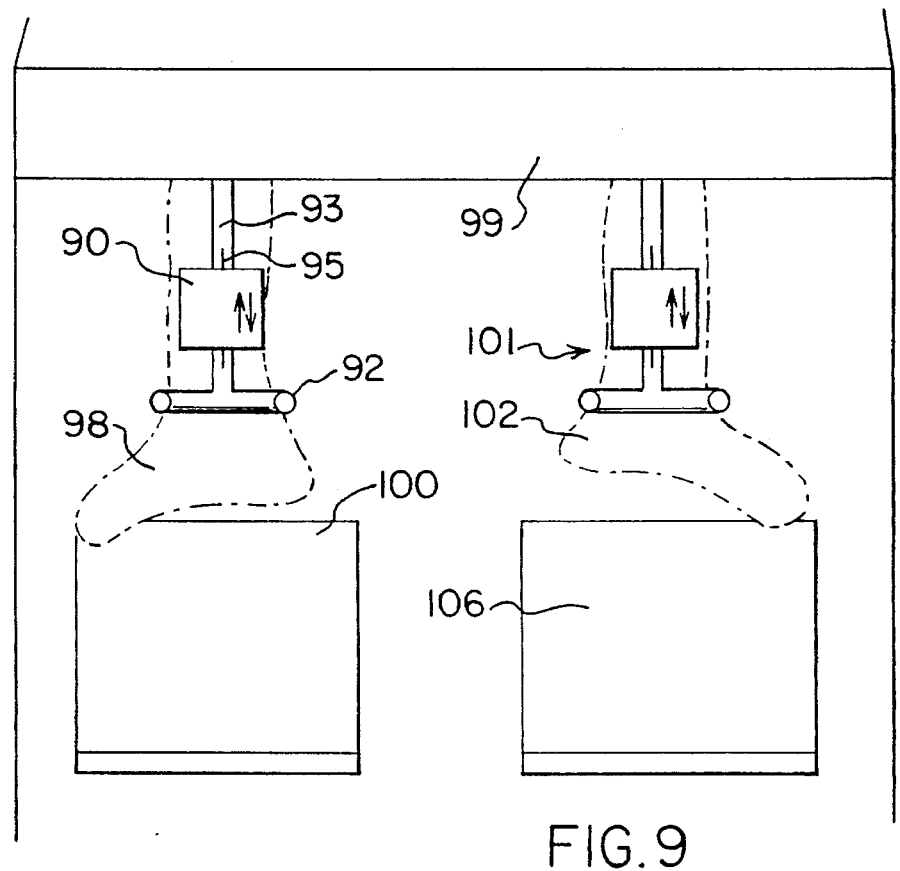
FIG. 9 is a top view of the FIG. 8 structure with the airbags deployed.

Note that the airbags of FIGS. 8, 9 and 10 are well suited for multiple, sequential actuations as well as for responding to multiple voted, redundant G force sensors such as those described previously herein. The sliding track mountings of the airbag modules advantageously enhances both the protection of the aircraft occupants and the amount of control available to the pilot despite serious trauma to the craft itself. In addition, it is possible to employ multiple airbags within the same module for the sequential responding function as well as for cooperating together to fill the space between occupant and instrument panel equivalent of the single airbags 98, 102 and 120 as shown.

Figure 13:
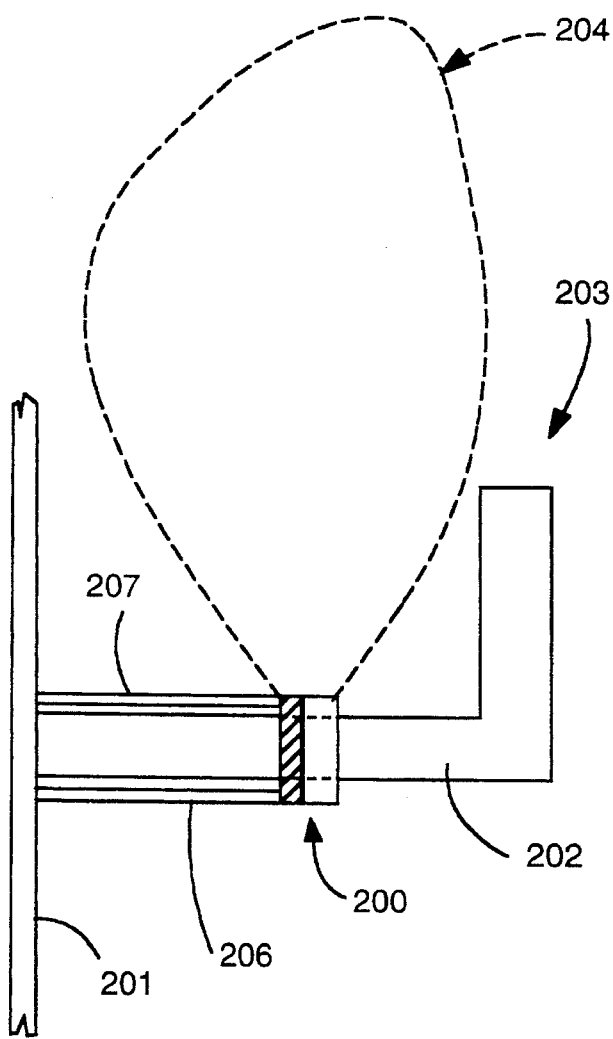
FIG. 13 is a side view of an embodiment of the invention wherein a disc-shaped airbag assembly is mounted to be fully supported by the aircraft's instrument panel in a manner to encircle the aircraft's control yoke shaft and in a manner to allow axial and rotational movement of the control yoke independent of the airbag assembly, and showing an airbag in its inflated dotted line position.

FIG. 13 is a side view of an embodiment of the invention wherein a disc-shaped airbag assembly 200 is mounted to be fully supported by the aircraft's instrument panel 201 in a manner to encircle the aircraft's control yoke shaft 202 and in a manner to allow axial and rotational movement of control yoke 203 independent of airbag assembly 200, and showing the airbag in its inflated dotted line position 204. In this arrangement, airbag assembly 200 is fully supported from instrument panel 201, for example by metal rods 206,207. The horizontal position of airbag assembly 200 along the horizontal run of yoke shaft 202 is suck that control yoke 203 may be moved fully to the left, to control aircraft pitch. without physically engaging airbag assembly 200.

Figure 14:
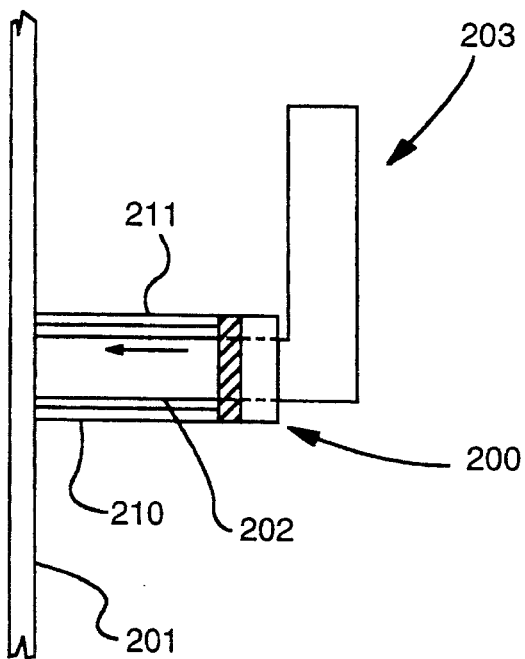
FIG. 14 is a side view of an embodiment of the invention similar to FIG. 13 wherein the disc-shaped airbag assembly of FIG. 13 is mounted to the aircraft's instrument panel by way of spring biased rods that telescope to accommodate full inward movement of the aircraft's control yoke as the pitch attitude of the aircraft is controlled.

FIG. 14 is a side view of another embodiment of the invention similar to FIG. 13 wherein disc-shaped airbag assembly 200 is mounted to instrument panel 201 by way of spring biased rods 210,211 that telescope to accommodate full inward movement of control yoke 203 as the pitch attitude of the aircraft is controlled. FIG. 14 shows control yoke 203 in its full leftward position. Spring biased rods 210,211 are constructed and arranged to position airbag assembly to the positions shown in FIG. 13 when control yoke 203 is in its normal level flight position.

Figure 15:
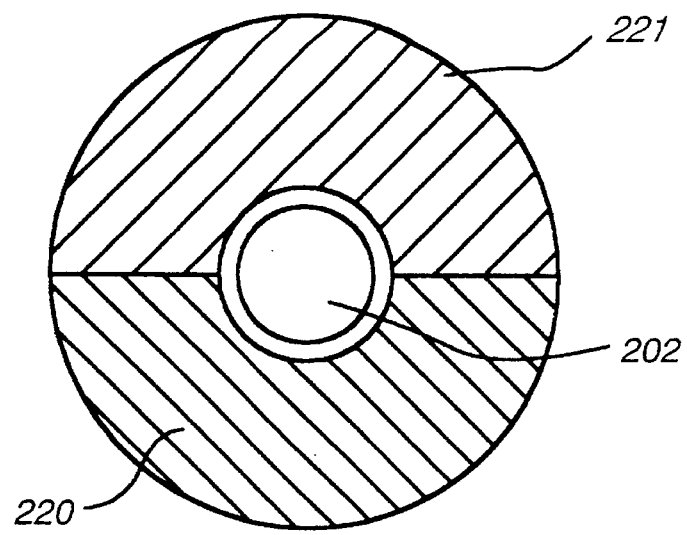
FIG. 15 is a sectioned front view of a disc-shaped airbag assembly of the type useable in FIGS. 13 and 14 wherein the airbag assembly includes a lower disposed airbag ignitor and an upper disposed stored airbag.

While the construction and arrangement of airbag assembly 200 of FIGS. 13 and 14 is not critical to the invention, FIG. 15 provides a front sectional view of a preferred disc-shaped airbag assembly 200 of the type useable in FIGS. 13 and 14 wherein airbag assembly 200 includes a lower disposed airbag ignitor 220 and an upper disposed stored airbag 221. In this arrangement, expansion of airbag assembly 221 is generally upward, as shown at 204 in FIG. 13.

Figure 16:
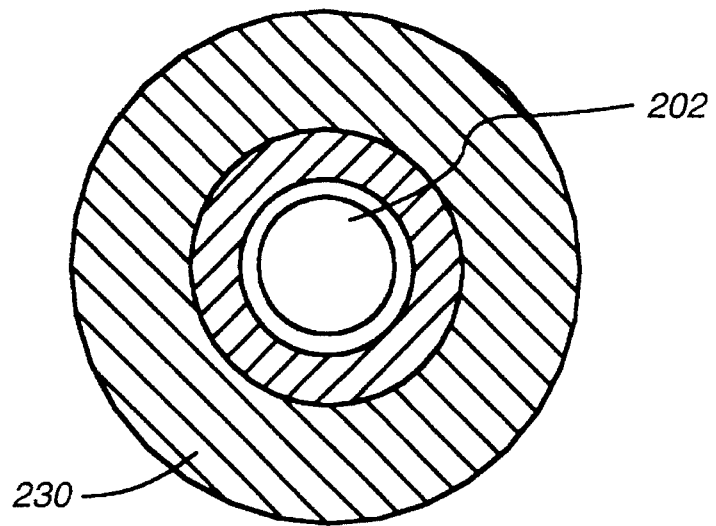
FIG. 16 is a sectioned front view of a disc-shaped airbag assembly of the type useable in FIGS. 13 and 14 wherein the airbag assembly includes a disc-shaped stored airbag.

Another preferred embodiment of airbag assembly 200 of FIGS. 13 and 14 is shown in FIG. 16 which provides a sectional front view of a disc-shaped airbag assembly 200 of the type useable in FIGS. 13 and 14 wherein the airbag assembly comprises a disc-shaped stored airbag 230 that is ignited by an ignitor that is located behind airbag 230.

Figure 17:
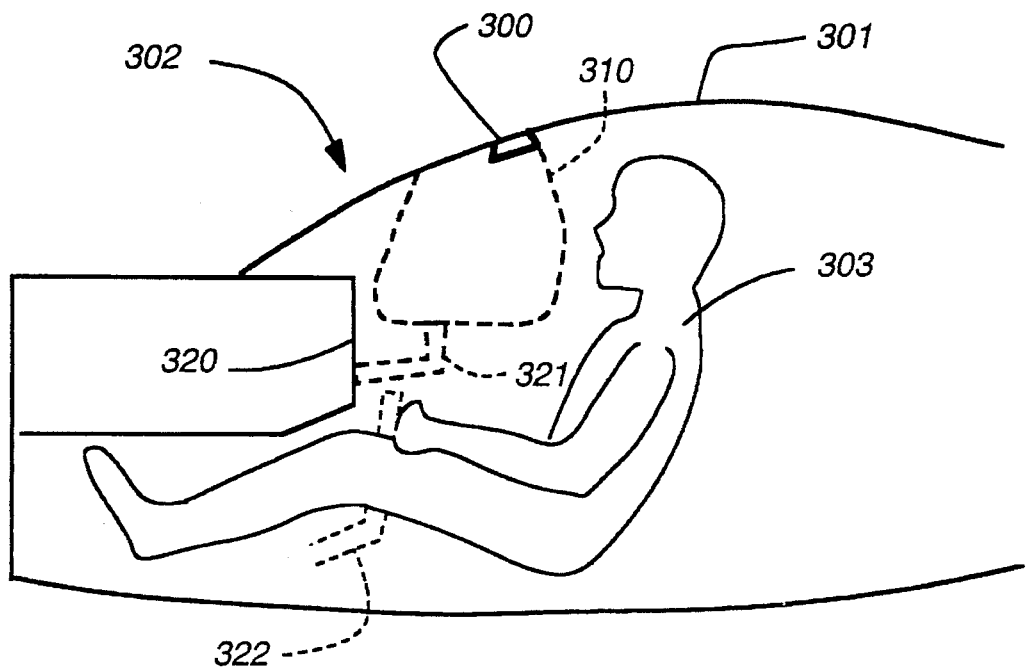
FIG. 17 shows an embodiment of the invention wherein an airbag assembly is mounted on the ceiling of an aircraft, generally above and somewhat forward of the pilot, the airbag assembly being of a size such that when inflated, as shown in dotted line, the pilot is protected from impact with the instrument panel, and yet subsequent operation of the control yoke by the pilot is not prevented by obstruction of the control yoke.

FIG.17 shows an embodiment of the invention wherein an airbag assembly 300 is mounted on the ceiling 301 of an aircraft 302, generally above and somewhat forward of the pilot 303. In this embodiment of the invention airbag assembly 300 includes an airbag that is of a size such that when inflated, as shown by dotted lines 310, pilot 303 is protected from impact with instrument panel 320, and yet subsequent operation of control yoke 321, or control stick 322 by pilot 303 is not prevented by obstruction thereof.

Figure 18:
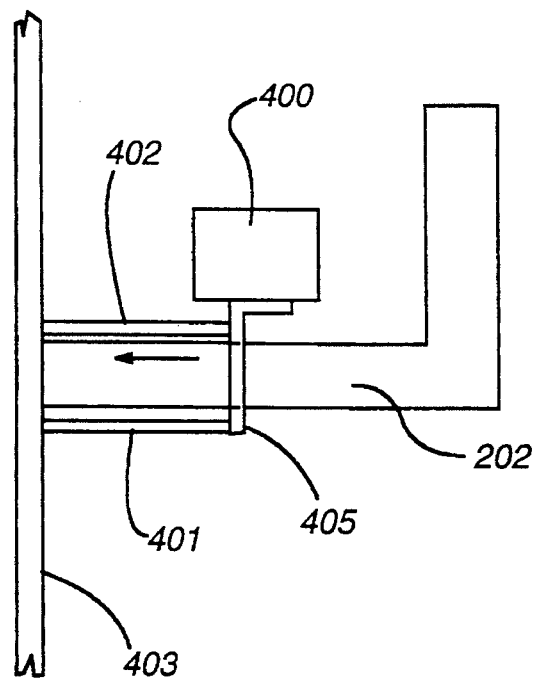
FIG. 18 is a side view of an embodiment of the invention similar to FIGS. 13 and 14 wherein an airbag assembly is mounted on a plate having an opening surrounding the aircraft control yoke.

FIG. 18 is a side view of an embodiment of the invention similar to FIGS. 13 and 14 wherein an airbag assembly 400 is mounted on a plate 405 having an opening surrounding aircraft control yoke 202. In this arrangement plate 405 is supported by posts 401,402 that attach plate 405 to instrument panel 403. If desired, posts 401,402 can be spring biased telescoping posts as above described.

It is to be noted that in the embodiments of the inventions shown in FIGS. 13, 14 and 18 the uninflated airbag assemblies do not interfere with pilot visibility due to the positioning of the airbag assemblies.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. Apparatus for minimizing the prospect for loss of control of an aircraft that has a control yoke assembly, the control yoke assembly including a generally horizontally extending post that defines an axis, said post extending from a control panel to a hand member that is manually grippable by an individual for linear motion of said post along said axis to control pitch of the aircraft, and for rotary motion of said post about said axis to control roll of the aircraft, comprising;

an airbag assembly including an inflatable airbag mounted relative to said post, said airbag assembly operating to expand so as to substantially fill a space both between said control panel and the individual, and means mounting said airbag assembly for free movement along a line that extends generally parallel to said axis, while retaining said airbag assembly against movement in any other direction, whereby said airbag assembly will assume a neutral position along said line parallel to said axis.

2. The apparatus of claim 1 including;

an annular airbag assembly having a generally centrally disposed through-opening that is positioned to freely surround said post, and a plurality of support members connected to said control panel and to said airbag assembly, said support members being operable to support said airbag assembly so as to freely surround said post.

3. The apparatus of claim 2 wherein said annular airbag assembly includes a top disposed folded airbag and a bottom disposed airbag ignitor.

4. The apparatus of claim 3 wherein said airbag assembly includes an annular folded airbag.

5. The apparatus of claim 2 wherein said plurality of support members comprise spring biased support members that telescope to accommodate said linear motion of said post along said axis to control pitch of said aircraft.

6. The apparatus of claim 5 wherein said annular airbag assembly includes a top disposed folded airbag and a bottom disposed airbag ignitor.

7. The apparatus of claim 6 wherein said airbag assembly includes an annular folded airbag.

8. The apparatus of claim 1 including;

a plate having a through-opening that is positioned to freely surround said post, and a plurality of support members connected to said control panel and to said plate, said support members being operable to support said plate so as to freely surround said post, and an airbag assembly mounted on said plate.

9. The apparatus of claim 8 wherein said plurality of support members comprise spring biased support members that telescope to accommodate said linear motion of said post along said axis to control pitch of said aircraft.

* * * * *